US009759736B2

(12) United States Patent
Zamama et al.

(10) Patent No.: US 9,759,736 B2
(45) Date of Patent: Sep. 12, 2017

(54) DEVICE FOR DETERMINING WIND SPEED COMPRISING A PLURALITY OF LASER SOURCES

(71) Applicants: Epsiline, Toulouse (FR); Institut National Polytechnique de Toulouse, Toulouse (FR)

(72) Inventors: Otmane Zamama, Toulouse (FR); Raphaël Teysseyre, Toulouse (FR); Julien Perchoux, Toulouse (FR)

(73) Assignees: EPSILINE, Toulouse (FR); Institut National Polytechnique de Toulouse, Toulouse (FR)

( * ) Notice: Subject to any disclaimer, the term of this patent is extended or adjusted under 35 U.S.C. 154(b) by 272 days.

(21) Appl. No.: 14/395,026

(22) PCT Filed: Apr. 15, 2013

(86) PCT No.: PCT/FR2013/050824
§ 371 (c)(1),
(2) Date: Oct. 16, 2014

(87) PCT Pub. No.: WO2013/156723
PCT Pub. Date: Oct. 24, 2013

(65) Prior Publication Data
US 2015/0077735 A1    Mar. 19, 2015

(30) Foreign Application Priority Data
Apr. 16, 2012  (FR) ...................................... 12 53491

(51) Int. Cl.
*G01P 3/36*    (2006.01)
*G01P 5/26*    (2006.01)
(Continued)

(52) U.S. Cl.
CPC .............. *G01P 5/26* (2013.01); *G01S 7/4916* (2013.01); *G01S 17/58* (2013.01); *G01S 17/87* (2013.01); *G01S 17/95* (2013.01)

(58) Field of Classification Search
CPC . G01P 5/26; G01S 17/58; G01S 17/95; G01S 17/87; G01S 7/4916
(Continued)

(56) References Cited

U.S. PATENT DOCUMENTS 5,088,815 A * 2/1992 Garnier ..................... G01P 5/26
356/28.5
6,297,878 B1   10/2001 Miller
(Continued)

OTHER PUBLICATIONS

Machuga, D.W. et al., "A Direct Doppler Detection Lidar System for Atmospheric Winds," Proceedings of IEEE Topical Symposium on Combined Optical, Microwave, Earth and Atmosphere Sensing, pp. 4-7, Mar. 22-25, 1993.

*Primary Examiner* — Mark Hellner
(74) *Attorney, Agent, or Firm* — Seed IP Law Group LLP

(57) ABSTRACT

This device for determining wind speed comprises at least two laser sources emitting beams in different directions that are coplanar and such that each emission direction corresponds to a perpendicular emission direction. Each laser source is associated with focusing optics for focusing the emitted beam, a laser diode for receiving a reflected beam obtained after reflection by a particle present in the air of the corresponding emitted beam, a photodiode for transmitting an interference signal occurring between the emitted beam and the reflected beam, a processor for processing the obtained interference signals, and an optical cavity into which the reflected beam is reinjected in order to obtain an interference with the emitted beam.

6 Claims, 4 Drawing Sheets

Figure 1:
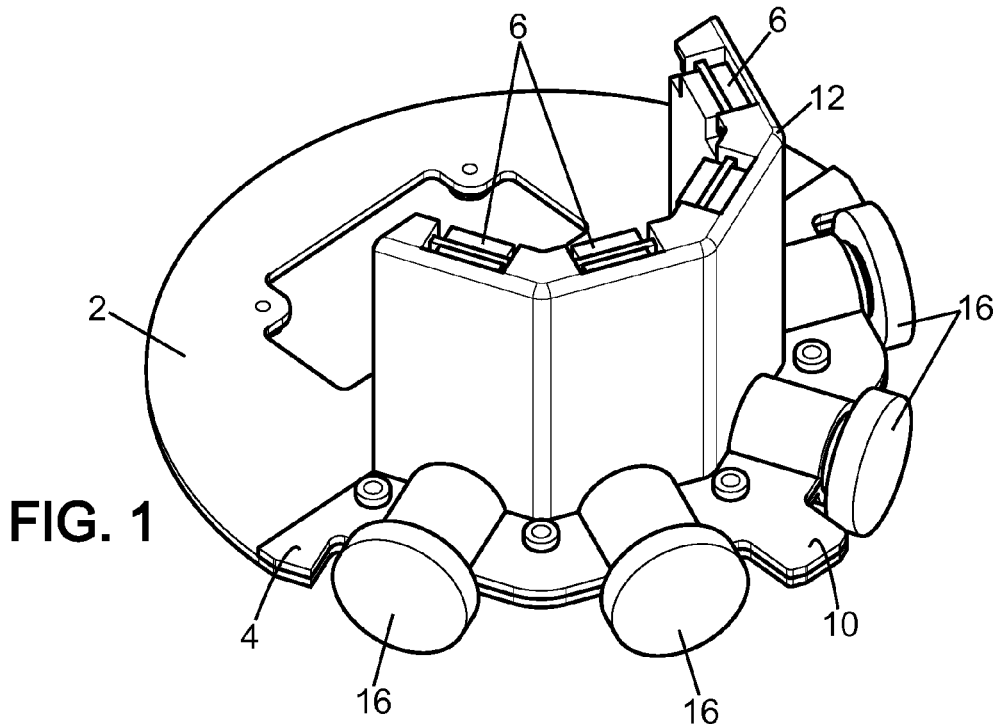

(51) Int. Cl.
   *G01S 17/58*     (2006.01)
   *G01S 17/87*     (2006.01)
   *G01S 17/95*     (2006.01)
   *G01S 7/491*     (2006.01)
(58) Field of Classification Search
   USPC ........................................................ 356/28.5
   See application file for complete search history.

(56) References Cited

U.S. PATENT DOCUMENTS 8,339,584 B2 * 12/2012 Christian .................. G01P 5/26
   356/28
   2002/0024652 A1     2/2002 Ooga
   2010/0277714 A1    11/2010 Pedersen et al.
   2012/0242976 A1     9/2012 Lepaysan et al.

* cited by examiner

DEVICE FOR DETERMINING WIND SPEED COMPRISING A PLURALITY OF LASER SOURCES

The present invention relates to a device for determining wind speed comprising a plurality of laser sources.

It is known, on the one hand, to conduct a wind speed measurement with a laser source by establishing interference between a beam originating from said source and another beam reflected by a wind-borne particle and, on the other hand, to use several sources for determining the wind speed along several components.

Thus, for example, from the document WO-2009/046717, an anemometer using a LIDAR (Light Intensity Detection And Ranging) system is known. This device is capable of emitting a laser beam, which is focused by an optical system, toward a measurement volume in which the particles present in the air move at a speed corresponding to the speed of the wind. These particles in part reflect the emitted beam and then send a beam, called a reflected beam, in the direction of the optical system. Then, by causing the emitted beam to interfere with the reflected beam, it is possible, by application of the Doppler theory, to calculate the speed of the particles and thus of the wind.

The document WO-2011/042678 discloses a device for measuring wind speed in which the measurement is carried out by self-mixing, that is, that a single incident beam is used here. The reflected beam is reinjected into the optical cavity of the laser that emitted the incident beam. In this manner, the interference mixing is carried out in the laser cavity interior itself. The interferences are then detected by a photodiode arranged in the back of the laser source.

The document WO-00/29854 discloses a system with three axes using a heterodyne laser that includes a support provided with three different laser diodes supplying beams of coherent light. These beams are sent onto beam expanding mirrors that send a reflected beam back onto a focusing mirror that focuses the beams along three divergence axes forming known angles between themselves at three separate locations in space. The device disclosed by this document uses systems that are difficult to use (with mirrors to produce the reflected beams). In addition, one notes that the three axes provided in the system are not coplanar.

The aim of the present invention therefore is to provide a device for determining wind speed that is both inexpensive and precise. The aim of the device according to the present invention is to be able to determine the speed of the wind when the direction thereof is oriented in a predetermined range of directions. Advantageously, the present invention will also make it possible to determine the speed of wind regardless of the orientation thereof. Another aim of the present invention is to provide a device that makes it possible to measure small wind speeds.

For this purpose, the present invention proposes a device for determining wind speed comprising a plurality of laser sources emitting beams in different directions, each laser source being associated with:
- means for focusing the emitted beam,
- means for receiving a reflected beam obtained after reflection of the corresponding emitted beam by a particle present in the air,
- means for transmitting an interference signal occurring between the emitted beam and the reflected beam,
- means for processing the obtained interference signals.

According to the present invention, this device for determining wind speed comprises at least two laser sources; the emission directions of the laser sources are coplanar; the emission directions are such that each emission direction corresponds to a perpendicular emission direction, and each laser comprises an optical cavity into which the reflected beam is reinjected in order to obtain an interference with the emitted beam.

The solution proposed here is to arrange two detectors (assembly comprising a laser source and the means for receiving a reflected beam) perpendicularly with respect to each other, each detector being a laser detector with optical reinjection, also known as a self-mixing detector. This solution is easy to implement and makes it possible to determine the wind speed in the plane containing the emission directions of the laser sources, that is, to determine the modulus of the wind velocity vector and more precisely the modulus of the component in the plane in question of the wind velocity vector.

To improve the quality of the measurement of the speed, in particular when the wind has certain directions with respect to the detectors, the invention proposes that the device comprise advantageously four laser sources forming two pairs of sources, that each pair of sources define an orthogonal reference in the plane, and that the two orthogonal references thus defined have the same origin. In this embodiment variant, the two orthogonal references are preferably offset with regard to one another by an angle of more than 10°, even more preferably by an angle between 30° and 60°, such as 45°, for example.

Preferably, in a device according to the present invention, the laser sources used are all alike.

The present invention in addition proposes a method for determining wind speed, characterized in that it comprises the following steps:
- emission of a laser beam in two perpendicular directions from a laser diode,
- recovery within each laser diode of a beam reflected by a particle suspended in air,
- interference of the reflected beam with the emitted beam in each laser diode,
- collection of a modulated signal,
- amplification of the modulated signal,
- sampling of the amplified signal,
- fast Fourier transform of the sampled values,
- thresholding of the signal obtained,
- determination of the Doppler frequency for each signal, and
- calculation of the wind speed by recomposition of the results obtained.

In this method, it is possible to provide that the steps are carried out simultaneously for four laser sources forming two pairs of sources, that each pair of sources defines an orthogonal reference in the plane, and that the two orthogonal references thus defined have the same origin.

Figure 2:
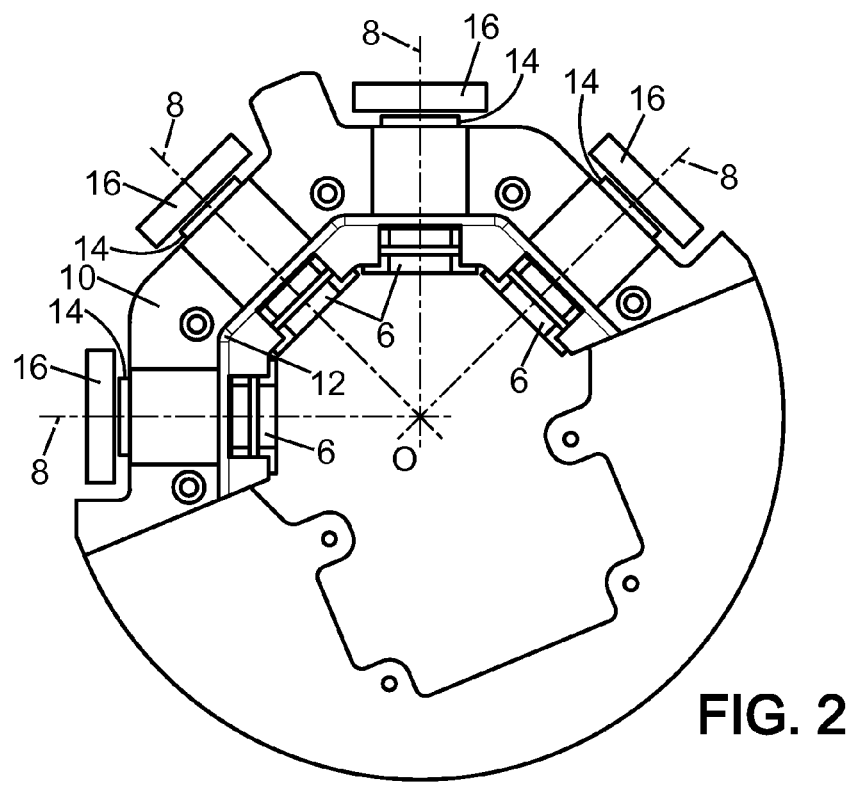
Figure 3:
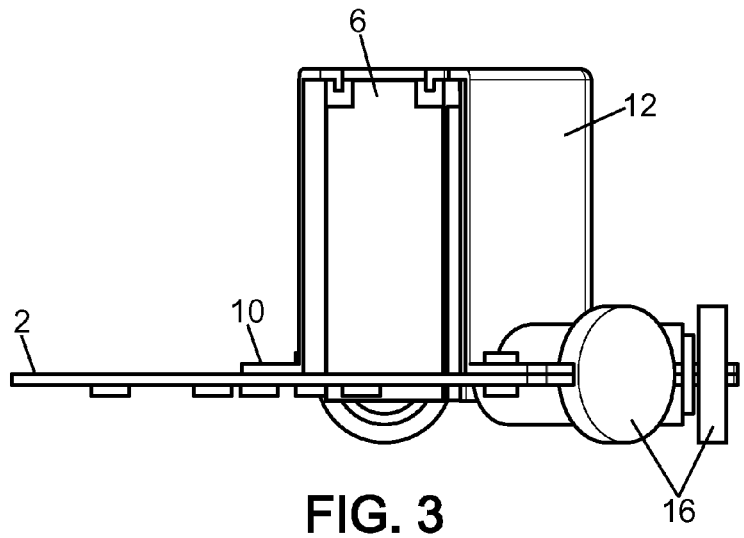
Figure 4:
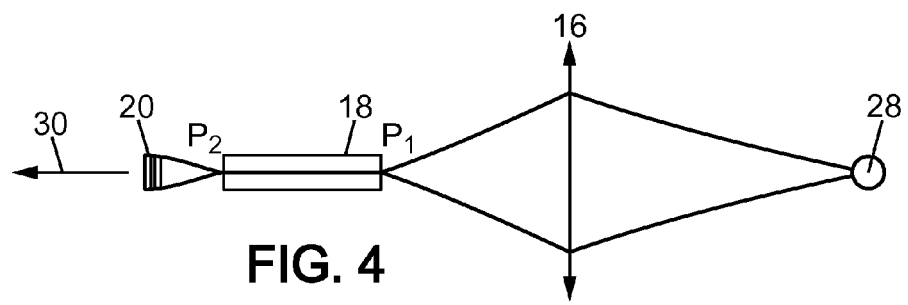
Figure 5:
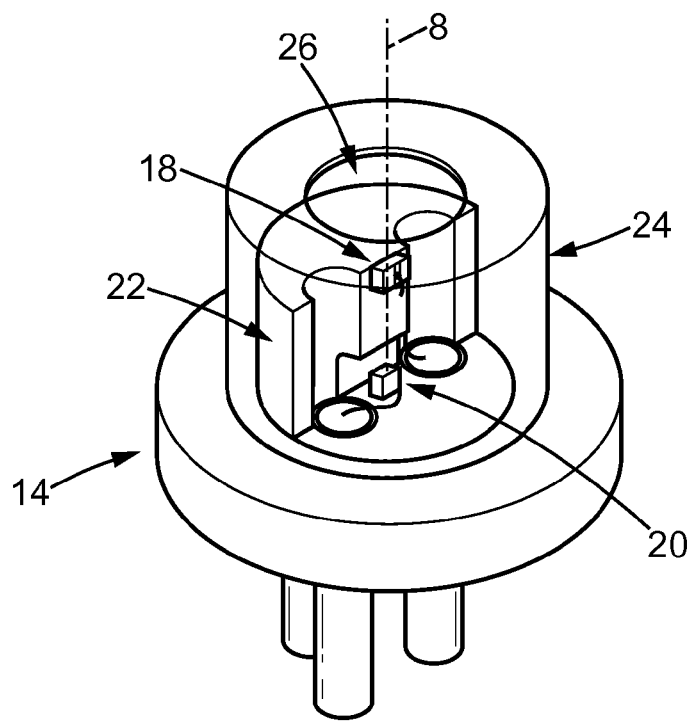
Figure 6:
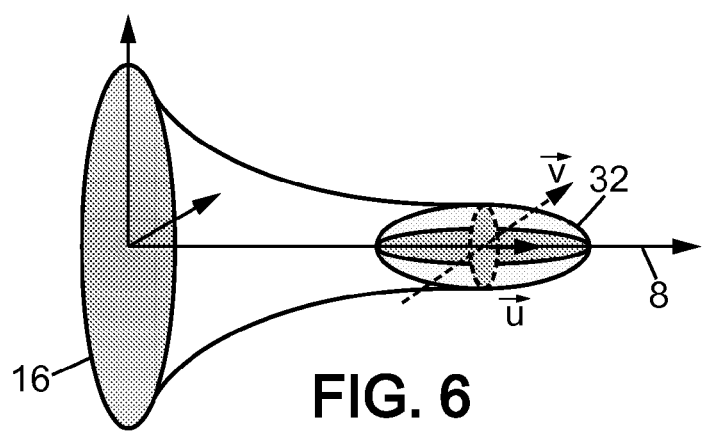
Figure 7:
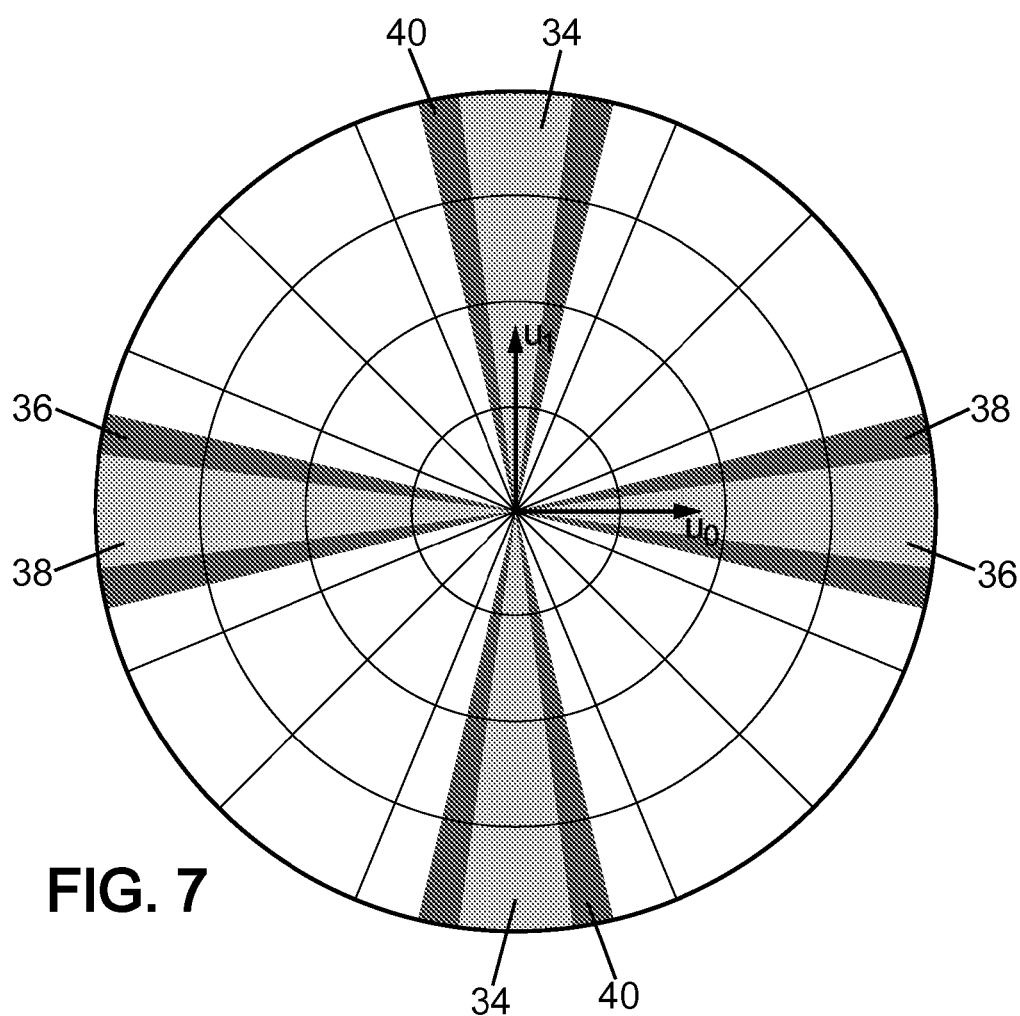

Details and advantages of the present invention will be clarified by the following description made in reference to the appended diagrammatic drawing in which:

FIG. 1 is a perspective view of a measuring device according to the present invention, FIG. 2 is a top view of the device of FIG. 1, FIG. 3 is a side view of the device of FIGS. 1 and 2, FIG. 4 is a flow diagram illustrating the operation of a laser anemometer by optical reinjection, FIG. 5 is a perspective view and partial cutaway of a detector that can be used in a device as represented in FIGS. 1-3, FIG. 6 illustrates a measurement volume of a laser source, and FIG. 7 illustrates a top view of the different measurement areas corresponding to a pair of laser sources.

FIGS. 1-3 illustrate an anemometer according to the present invention in a preferred embodiment. One can see in particular in FIG. 1 a support 2, a cover 4, and electronic cards 6.

The support 2 is in the form of a plate with a substantially circular contour. The support is openwork in its center to allow, in particular, the passage of power supply and signal cables (not shown). On its periphery, the support 2 has four hollow deformations on the side of its surface referred to as upper surface. The opposite surface of the support 2, or lower surface, has bumps corresponding to the above-mentioned hollow areas. Each hollow area extends radially with respect to the center of the support 2 and has a concave surface of approximately circular cylindrical shape. The axes 8 (FIG. 2) of these circular cylindrical areas are offset with respect to one another by 45 degrees, and they intersect at a point O located substantially in the center of the support 2.

The cover 4 has a first portion 10, which covers the hollow areas of the upper surface of the support 2, as well as a second portion 12 that extends substantially perpendicularly to the plane of the plate of the support 2.

The first portion 10 has deformations symmetric to the deformations of the hollow areas of the support 2. By selecting the same orientation as the orientation defined above, one thus finds again hollow areas of substantially circular cylindrical shape in the lower surface of the first portion 10 of the cover 4. The first portion 10 of the cover 4 then defines, with the support 2, recesses of overall circular cylindrical shape, each of which is intended to receive a detector, for example, a detector such as the detector 14 illustrated in FIG. 5. A focusing optics 16 visible in FIGS. 1-3 is associated with each one of these detectors 14.

The second portion 12 of the cover 4 is formed of four sections that are each substantially planar and extend, on the one hand, perpendicularly to the support 2, and, on the other hand, to an axis 8. If one assumes that the support 2 extends in a substantially horizontal plane, the second portion 12 of the cover 4 forms a semi-cylinder with a vertical axis and a regular octagonal base. Each section of the second portion 12 of the cover 4 is used as support and protection for an electronic card 6.

Each detector 14 comprises at its center a laser diode 18. The latter is intended to emit beams in an emission direction. By construction, the support 2 and the cover 4 are such that each of the above-defined axes 8 corresponds to an emission direction of a laser diode 18 that is placed in a recess provided for this purpose by the support 2 and the cover 4.

On the axis 8 corresponding to a laser diode 18, a photodiode 20 is located. Here, an orientation is selected arbitrarily, and it is assumed that the photodiode 20 is located in each case to the rear of the laser diode 18.

The assembly formed by the laser diode 18 and the photodiode 20 is arranged in a thermal dissipater 22, itself mounted in a casing 24 (FIG. 5). In front of the laser diode 18, the casing 24 has a window 26 so that a laser beam emitted along the axis 8 by the laser diode 18 can reach the corresponding focusing optics 16.

Each detector 14 used for producing a device according to the present invention is, for example, a detector such as the one described in the document WO2011/042678, the content of which is incorporated herein by reference (in particular page 5, line 26 to page 7, line 13, and FIG. 1).

The technique used to conduct a measurement of wind speed is a technique referred to as self-mixing or also optical reinjection. This technique is a laser Doppler effect anemometry technique using a single incident beam.

According to this technique, a beam is emitted by a laser diode comprising an optical cavity. When it encounters a particle suspended in air, a fraction of this beam is reflected, thus forming a reflected beam which is reinjected into the interior of the laser diode, and more precisely into the optical cavity present in the laser diode. This technique makes it possible to exploit the optical gain of the active area of the laser diode. Conventionally in laser anemometry, an interference is produced between a reference beam and a beam reflected by an element for which one wishes to determine the speed. Here, the interference mixing is brought about within the laser diode that sends the incident beam onto the particle for which one wishes to measure the speed.

FIG. 4 diagrammatically illustrates the measurement principle used here. The laser diode 18 is a semiconductor laser diode having an active area modeled by a Fabry-Perot optical cavity. This laser diode emits an optical power $P_1$ through the front and an optical power $P_2$ through the back. The beam emitted through the front is focused by the corresponding focusing optics 16 and then reflected by a particle 28. The beam reflected by the particle 28 returns to the interior of the laser diode 18 and it modulates the power signal $P_2$ exiting through the back of the laser diode 18. The photodiode 20 then generates a signal 30 representative of the optical power that it has received.

It can be assumed that the laser beams exiting the laser diode 18 are Gaussian with an elliptical section. The optical system corresponding to the focusing optics 16 is, for example, a converging aspherical lens. In this case, the Gaussian shape of the beams is preserved. As illustrated in FIG. 6, the front beam emitted by the laser diode 18 is focused by the focusing optics 16 so as to form a measurement volume 32 of substantially ellipsoid shape. This measurement volume 32 corresponds to the set of the points in space where the passage of a particle 28 yields a sufficient signal-to-noise ratio to allow detection by the photodiode 20 (and the associated electronic card 6).

It is assumed that a particle 28 passes through the measurement volume 32 with a velocity $\vec{V}$. The velocity of the particle 28 is considered to be also the wind speed. This particle reflects a portion of the beam emitted by the laser diode and it reemits said portion toward the laser diode 18. This backscattered wave is frequency shifted relative to the incident laser wave. When the reflected beam is injected into the optical cavity of the laser diode, a coupling between the emitting area of the laser diode and the area of the passage of the reflected beam is produced. An interference phenomenon occurs in the interior of the laser cavity. Thus, the optical power $P_2$ emitted through the back of the laser diode 18 arrives at the photodiode 20 by being modulated at the Doppler shift frequency, the latter being directly proportional to the velocity of the particle. The power modulation is then written as follows:

$P_2(t) = P_0(1 + m\cos(2\pi \Delta f\, t))$

The Doppler frequency is expressed as follows:

$$\Delta f = \frac{2}{\lambda} |\vec{V} \cdot \vec{u}|$$

$\vec{V}$ is the velocity vector of the particle considered to be the wind velocity vector.

$\vec{u}$ is the unit vector corresponding to the optical axis 8 or to the propagation axis of the laser beam.

$|\vec{V}, \vec{u}|$ is the scalar product that gives the projection of the velocity vector on the axis of the laser beam.

λ is the wavelength of the laser.

m is the index of the modulation of amplitude generated by the interference.

The modulation index of the signal is weak, on the order of $10^{-5}$, so that even after amplification, the time signal is still drowned in the noise of the acquisition system. As an illustrative example, the modulation index is approximately $5.5 \cdot 10^{-6}$ for a particle having a radius of 0.1 µm. In contrast, in the frequency domain, if the signal-to-noise ratio (SNR) is sufficient, the spectrum of such a signal contains a detectable peak corresponding to the Doppler frequency. It is possible to get the position of the peak again by applying Fast Fourier Transform (FFT) and thus derive the wind speed therefrom.

The acquisition chain containing the laser diode 18, the photodiode 20, amplification electronics and signal processing electronics which are integrated in the corresponding electronic card 6 thus makes it possible to measure a projection of the wind velocity vector on the axis of the laser beam and it constitutes the base module of a laser anemometer with optical reinjection.

The measurements carried out by each detector make it possible to determine the component of the velocity vector V on the optical axis of the corresponding system. In theory, it is therefore necessary to have at least two orthogonal detectors to be able to determine the projection of a velocity vector in a plane, and three orthogonal detectors to determine the modulus of an arbitrary velocity vector in space. Instead of using several detectors and thus several laser sources, one can envisage using a mobile component or the use of a beam separator.

The present invention proposes using several detectors with optical reinjection.

According to the present invention, it is proposed to use two detectors 14, whose optical axes 8 are perpendicular with respect to each other, for determining the value of the velocity component of particles suspended in the air in the plane defined by the two corresponding axes 8. As explained below, it was observed that an anemometer with only two detectors had blind areas in which it was not possible to carry out the measurement of the velocity of the particles in a reliable manner. Therefore, it is proposed, in an original manner, to add not one but two detectors, the two added detectors 14 also having optical axes perpendicular to each other. One then gets four detectors that are arranged in such a manner that their optical axes intersect at point O as described above. As mentioned above, there are two pairs of detectors 14, the detectors in each respective pair having perpendicular optical axes 8. As illustrated in FIGS. 1-3, a preferred embodiment provides for the two pairs of detectors to be arranged in each case in such a manner that an axis 8 of a detector in one pair of detectors forms the bisector of the optical axes 8 of the other pair of detectors. In other words, there are four optical axes passing through the same point O, and each optical axis forms an angle of 45 degrees with the neighboring optical axis.

This preferred embodiment is not the only possible embodiment according to the present invention. Other relative positions between two pairs of detectors could also be considered, for example.

The continuation of the description is a justification of the solution implemented by the present invention.

To produce a quality anemometer, it is necessary to be able first of all to perform precise measurements. Next, weak wind speeds also have to be measured. Finally, the measurement volume has to be sufficiently large to contain enough suspended particles and thus make it possible to conduct measurements at a sufficiently high frequency.

As an illustration of the precision of the measurement, it is proposed to reach a precision of 0.1 m/s for a speed of 20 m/s. On the basis of the following calculations, it is naturally possible to use other numerical values which are given here purely for illustration and in a nonlimiting manner.

If one then selects a laser beam having a wavelength of 785 nm, for example, and a velocity perfectly collinear with a laser beam, one gets a Doppler frequency, using the above indicated formula, of 50 MHz, that is to say:

Δf=50 MHz

λ=785 nm

V=20 m/s

Using fast Fourier transform, with 1024 points by sampling at a frequency F=100 MHz (=2Δf to comply with the Nyquist-Shannon theorem), one gets a processing error:

E=λF/4N

E being the error for the velocity generated by the processing,

F the sampling frequency, and

N the number of sampling points.

With the numerical values given as a nonlimiting numerical example, one gets here E=0.02 m/s.

It is assumed that this processing error E is the same in the more general case in which the laser beam is not collinear with the velocity vector.

Another source of error can be mechanical. Indeed, it is possible that during the positioning of the laser diode 18, its axis 8 is misaligned relative to the desired direction due to the mechanical mounting. Let α be the angular misalignment error and A the angle between the axis 8 and the wind velocity vector.

Thus $V_{r\ alignment}$=V cos A in the absence of misalignment and $V_{r\ misalignment}$=V cos (A+α) in the opposite case, or $V_{r\ misalignment}$=V cos (A±α)

$V_{r\ misalignment}$=V (cos A±α sin A−α²/2 cos A)

$V_{r\ misalignment}$=$V_{r\ alignment}$±V (α sin A−α²/2 cos A)

Thus, the maximum error due to the misalignment is:

$δV_{r\ misalignment}$=Vα

The maximum error generated by the processing, the misalignment and the direction of the wind thus is:

E=λF/4N+Vα

To be able to carry out measurements, as indicated above, it is advisable to have a sufficient number of particles passing through the measurement volume 32 illustrated in FIG. 6. The number of particles passing through the measurement volume 32 depends first of all on the number of particles per unit of volume. This number of particles then depends on the speed of the wind. The more powerful the wind is, the higher the number of particles passing through a given volume will be. The number of particles is also proportional to the surface area of the measurement volume seen by the velocity vector. In the ellipsoid shape represented in FIG. 6, one notes that it is at the time when the velocity vector is perpendicular to the axis 8 that the surface area of the measurement volume 32 appears to be the largest for the velocity vector. For a given unit of time, the number of particles passing through the measurement volume will therefore be the following:

$F_{det} = \rho V S'$ $F_{det}$ is the calculated number of particles $\rho$ is the density of particles per unit of volume V is the norm of the velocity vector S' is the surface area of the measurement volume seen by the velocity vector.

In addition, if B is the angle between the optical axis 8 of the detector in question and the velocity vector, one gets:

$F_{det} = \rho V S \sin B$

S being the maximum surface area of the measurement volume 32 seen by the velocity vector, that is to say the surface area of the measurement volume seen perpendicularly with respect to the optical axis 8 of the corresponding detector.

Thus one gets:

$\sin B = S'/S$

One thus notes here that the number of particles will decrease especially since the velocity vector is parallel to the optical axis 8 of the detector.

As far as the measurement of slow speeds is concerned, the 1/f noise and the low cutoff frequency of the amplifier refer to the first point of the fast Fourier transform. Thus, the corresponding frequency gives the low limit of measurable speed:

$F/N = (2V \cos B)/\lambda$

Thus:

$\cos B = (\lambda F)/(2VN)$

The results of these calculations are illustrated in FIG. 7.

In this figure, a direction $u_0$ and a direction $u_1$ are represented, which correspond to two orthogonal directions of the two detectors 14. For the detector 14 oriented in the direction $u_0$, one gets a blind area 34 which corresponds to the area in which it will not be possible to detect excessively low speeds with the corresponding detector. Similarly, there is a blind area 36 that cannot be detected by the detector 14 oriented in the direction $u_1$.

For the criterion concerning the number of particles that can be detected per unit of time, there is a blind area 38 for the detector oriented in the direction $u_0$ and a blind area 40 for the detector 14 oriented in the direction $u_1$.

For all the velocity vectors located in the reference ($u_0$, $u_1$), a corresponding measurement can be carried out by a pair of detectors with varying degrees of precision. Naturally, as is apparent from the above calculations, the precision will depend on the mechanical positioning of the detectors, on the selected sampling frequency as well as on the number of sampling points, and also on the angle between the laser beam and the wind velocity vector.

The invention thus proposes using only two of the detectors 14, arranged orthogonally, if one wishes to measure only velocity vectors that are not located in blind areas. An anemometer is then produced which can give, for example, excellent results when one succeeds in orienting it approximately with respect to the dominant wind. It should be noted that an anemometer with two orthogonally arranged detectors also allows measurements in the blind areas, if one accepts a degradation of the quality of the measurement of the wind for certain orientations and/or certain speeds.

To be able to measure multidirectional winds with a fixed anemometer and/or to guarantee a quality measurement regardless of what the direction of the wind is, it is proposed to use two pairs of orthogonal detectors 14, as is represented in FIGS. 1-3. Here one chooses to arrange a pair of detectors so that its blind areas (FIG. 7) do not cover the blind areas of the other pair of detectors. It is then possible to measure all the velocity vectors, regardless of what their components in the plane of the detectors are.

Thus, the measurement of a wind speed in a plane can be carried out by means of two or four detectors. The processing of the signals obtained by the (four) detectors is in fact parallel. Thus, beams are emitted simultaneously in each direction corresponding to a detector. The particles suspended in the air reflect a portion of the emitted beams and send a reflected beam back to the detectors. Said reflected beam penetrates into the interior of the optical cavity of the laser diode that originated the emission that gave rise to the reflection. The reflected beams then interfere in each one of the laser diodes, which emit backward a modulated signal detected by a photodiode. The photodiode of each detector supplies a signal in the form of an electrical current proportional to the power received. This signal also reproduces the power modulation due to the interference and it is then processed within a transimpedance amplifier. The signal in the form of a current is transformed and amplified in this signal processing step in the form of a voltage. The signal thus obtained (voltage) is sampled and analyzed by fast Fourier transform. A thresholding is then carried out, selecting as the threshold level, for example, a level that is three times higher than the noise level. For a given unit of time, for example, one second (1 s), one then determines the Doppler frequencies corresponding to the modulations of the detected signals.

The processing is carried out simultaneously within all the detectors. The results obtained are then analyzed and recomposed to supply the wind speed in the plane of the detectors.

The present invention thus makes it possible to obtain an anemometer that supplies reliable measurements of wind speed. Although it uses several laser beams, the solution proposed by the present invention has a low cost price, since the detectors used can be inexpensive, in particular due to the absence of complex optical systems of large size.

The present invention is not limited to the preferred embodiment, described above as a non-limiting example, or to the mentioned variants. It also concerns all the embodiment variants within reach of the person skilled in the art in the context of the claims below.

Thus, the description provides for the use of two or four detectors. This allows a measurement of the speed in a plane. The present invention could naturally also be used to measure the speed of the wind in space by increasing the number of detectors.

The type of detectors used is given only as an illustrative example. Other laser detectors with optical reinjection can be used.

In addition, the mounting of the detectors between a support and a cover is one mounting example. Any other type of mounting can be used to hold two orthogonal detectors with respect to each other and/or to arrange four (or more) laser detectors.

The invention claimed is:

1. A device for determining wind speed comprising:
a first laser source configured to emit a first emitted beam in a first direction;
a second laser source configured to emit a second emitted beam in a second direction that is perpendicular to the first direction and coplanar with the first direction,
first focusing optics configured to focus the first emitted beam toward a first particle present in air, wherein the first laser source is configured to receive a first reflected beam, obtained after reflection of the first emitted beam by the first particle, and transmit a first interference beam based on an interference between the first emitted beam and the first reflected beam, second focusing optics configured to focus the second emitted beam toward a second particle present in the air, wherein the second laser source is configured to receive a second reflected beam, obtained after reflection of the second emitted beam by the second particle, and transmit a second interference beam based on an interference between the second emitted beam and the second reflected beam, a first photodiode configured to receive the first interference beam and transmit a first interference signal representative of an optical power of the first interference beam;

a second photodiode configured to receive the second interference beam and transmit a second interference signal representative of an optical power of the second interference beam, an electronic card configured to process the first and second interference signals, wherein:

the first laser source comprises a first optical cavity into which the first reflected beam is reinjected in order to obtain the first interference beam, the second laser source comprises a second optical cavity into which the second reflected beam is reinjected in order to obtain the second interference beam, and the first and second laser sources form a first pair of sources that defines a first orthogonal reference in a plane in which the first and second directions are coplanar, and third and fourth laser sources that form a second pair of sources that defines a second orthogonal reference in the plane, the first and second orthogonal references thus defined have a same origin.

2. The device according to claim 1, wherein the first and second orthogonal references are offset with respect to one another by an angle of more than 10°.

3. The device according to claim 2, wherein the first and second orthogonal references are offset with respect to one another by an angle between 30° and 60°.

4. The device according to claim 3, wherein the first and second orthogonal references are offset with respect to one another by 45°.

5. The device according to claim 1, wherein the laser sources are alike.

6. A method for determining wind speed, comprising:

emitting a first emitted beam in a first direction from a first laser diode, emitting a second emitted beam in a second direction from a second laser diode, receiving within the first laser diode a first reflected beam reflected by a first particle suspended in air, the first emitted beam interfering with the first reflected beam in the first laser diode, receiving within the second laser diode a second reflected beam reflected by a second particle suspended in the air, the second emitted beam interfering with the second reflected beam in the second laser diode, collecting a first modulated signal based on the interfering first emitted beam and first reflected beam, collecting a second modulated signal based on the interfering second emitted beam and second reflected beam, amplifying the first and second modulated signals to obtain first and second amplified signals, sampling the amplified signals to obtain sampled values, fast Fourier transforming the sampled values to obtain first and second transformed signals, thresholding the first and second transformed signals, determining Doppler frequencies for the transformed signals, respectively, calculating the wind speed based on the Doppler frequencies, producing a third modulated beam based on an interference, within a third laser diode, between a third emitted beam and a third reflected beam produce by reflection of the third emitted beam by a third particle of the air, and producing a fourth modulated beam based on an interference, within a fourth laser diode, between a fourth emitted beam and a fourth reflected beam produce by reflection of the fourth emitted beam by a fourth particle of the air, wherein the first and second laser sources are a first pair of sources that defines a first orthogonal reference in a plane in which the first and second directions are coplanar, the third and fourth laser sources are a second pair of sources that defines a second orthogonal reference in the plane, and the first and second orthogonal references thus defined have a same origin.

* * * * *